(12) United States Patent
Zakowski

(10) Patent No.: US 11,224,312 B2
(45) Date of Patent: Jan. 18, 2022

(54) FOOD PROCESSOR HAVING EXTERNAL SLICING DISC ADJUSTMENT

(71) Applicant: Joseph W. Zakowski, New Canann, CT (US)

(72) Inventor: Joseph W. Zakowski, New Canann, CT (US)

(73) Assignee: CONAIR LLC, Stamford, CT (US)

( * ) Notice: Subject to any disclaimer, the term of this patent is extended or adjusted under 35 U.S.C. 154(b) by 605 days.

(21) Appl. No.: 14/246,221

(22) Filed: Apr. 7, 2014

(65) Prior Publication Data
US 2014/0299696 A1    Oct. 9, 2014

Related U.S. Application Data

(60) Provisional application No. 61/809,500, filed on Apr. 8, 2013.

(51) Int. Cl.
| A47J 43/00 | (2006.01) |
| A47J 43/07 | (2006.01) |
| B26D 1/29 | (2006.01) |
| B26D 7/26 | (2006.01) |
| B26D 1/147 | (2006.01) |
| B26D 3/26 | (2006.01) |

(52) U.S. Cl.
CPC .......... *A47J 43/0716* (2013.01); *B26D 1/147* (2013.01); *B26D 1/29* (2013.01); *B26D 7/2628* (2013.01); *B26D 3/26* (2013.01)

(58) Field of Classification Search
CPC .... A47J 43/00; A47J 43/0711; A47J 43/0716; A47J 43/0722; A47J 43/30; B02C 213/1871; B02C 213/1878; B02C 13/095

USPC ................. 99/318; 241/239, 92, 286, 169.1
See application file for complete search history.

(56) References Cited

U.S. PATENT DOCUMENTS

| 4,364,525 A * | 12/1982 | McClean ............... B26D 3/225 241/239 |
| 4,877,191 A * | 10/1989 | Golob ................... A47J 43/046 241/92 |
| 5,176,329 A * | 1/1993 | De Coster ............... A47J 42/08 241/169.1 |
| 5,957,174 A * | 9/1999 | Shadeck ................ B23Q 5/408 144/117.1 |
| 6,929,201 B1 * | 8/2005 | Blouse .................... A47J 42/04 241/168 |
| 7,967,229 B2 * | 6/2011 | Wilson .................... A47J 42/08 241/169.1 |
| 8,376,255 B2 * | 2/2013 | Wilson .................... A47J 42/08 241/168 |
| 8,814,072 B2 * | 8/2014 | Gushwa ............. A47J 43/0716 241/36 |
| 8,833,683 B2 * | 9/2014 | Beber .................... A47J 43/255 241/92 |

(Continued)

*Primary Examiner* — Faye Francis
(74) *Attorney, Agent, or Firm* — Grogan, Tuccillo & Vanderleeden LLP

(57) ABSTRACT

A food processor having an external slicing disc adjustment mechanism is provided. The food processor includes a work bowl and a lid configured to be selectively removable therefrom. The food processor further includes a slicing disc having a disc body and a slicing blade internal to the work bowl, and a mechanism for adjusting a spacing between the disc body and slicing blade. The mechanism includes a rotatable lever accessible form outside the work bowl.

10 Claims, 4 Drawing Sheets

(56) References Cited

U.S. PATENT DOCUMENTS

| | | | | |
|---|---|---|---|---|
| 8,899,504 | B2* | 12/2014 | Gushwa | A47J 43/0716 241/92 |
| 9,351,610 | B2* | 5/2016 | Wang | B26D 1/29 |
| 2005/0184177 | A1* | 8/2005 | Blouse | A47J 42/04 241/169.1 |
| 2005/0194484 | A1* | 9/2005 | Starr | A47J 43/0716 241/285.2 |
| 2008/0093489 | A1* | 4/2008 | Hadj-Chikh | A47J 42/04 241/169.1 |
| 2011/0139017 | A1* | 6/2011 | Beber | A47J 43/085 99/537 |
| 2013/0134248 | A1* | 5/2013 | Gushwa | A47J 43/0716 241/101.2 |

* cited by examiner

FOOD PROCESSOR HAVING EXTERNAL SLICING DISC ADJUSTMENT

CROSS-REFERENCE TO RELATED APPLICATIONS

This application claims the benefit of U.S. Provisional Application Ser. No. 61/809,500, filed on Apr. 8, 2013, which is herein incorporated by reference in its entirety.

FIELD OF THE INVENTION

The present invention relates to food processors and, more particularly, to a food processor having an external slicing disc adjustment mechanism.

BACKGROUND OF THE INVENTION

Food processing devices providing a number of different types of food preparations, such as mixing, grinding, chopping, slicing, grating, shredding, or other processing operations, are well known. Existing food processing devices typically include a base housing an electric motor, a drive shaft driven by the motor, a bowl receivable on the base and a lid or cover having a feed tube releasably mounted to the bowl. A rotatably driven blade is mounted to the drive shaft to process one or more food items inside the bowl.

While existing food processing devices are generally suitable for what is regarded as ordinary performance, there is room for improvement in terms of ease of use and expanded functionality. In particular, a limitation of existing food processing devices is that when utilized with a slicing disc, they must be turned off and the blade assembly removed in order for a user to manually adjust the slicing thickness on the blade.

SUMMARY OF THE INVENTION

It is an object of the present invention to provide a food processor having a mechanism for adjusting the slicking thickness of a slicing disc.

It is another object of the present invention to provide a food processor having a mechanism for externally adjusting the slicing thickness of a slicing disc.

These and other objects are achieved by the present invention.

According to an embodiment of the present invention, a food processor having an external slicing disc adjustment mechanism is provided. The food processor includes a work bowl and a lid configured to be selectively removable therefrom. The food processor further includes a slicing disc having a disc body and a slicing blade internal to the work bowl, and a mechanism for adjusting a spacing between the disc body and slicing blade. The mechanism includes a rotatable lever accessible form outside the work bowl.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
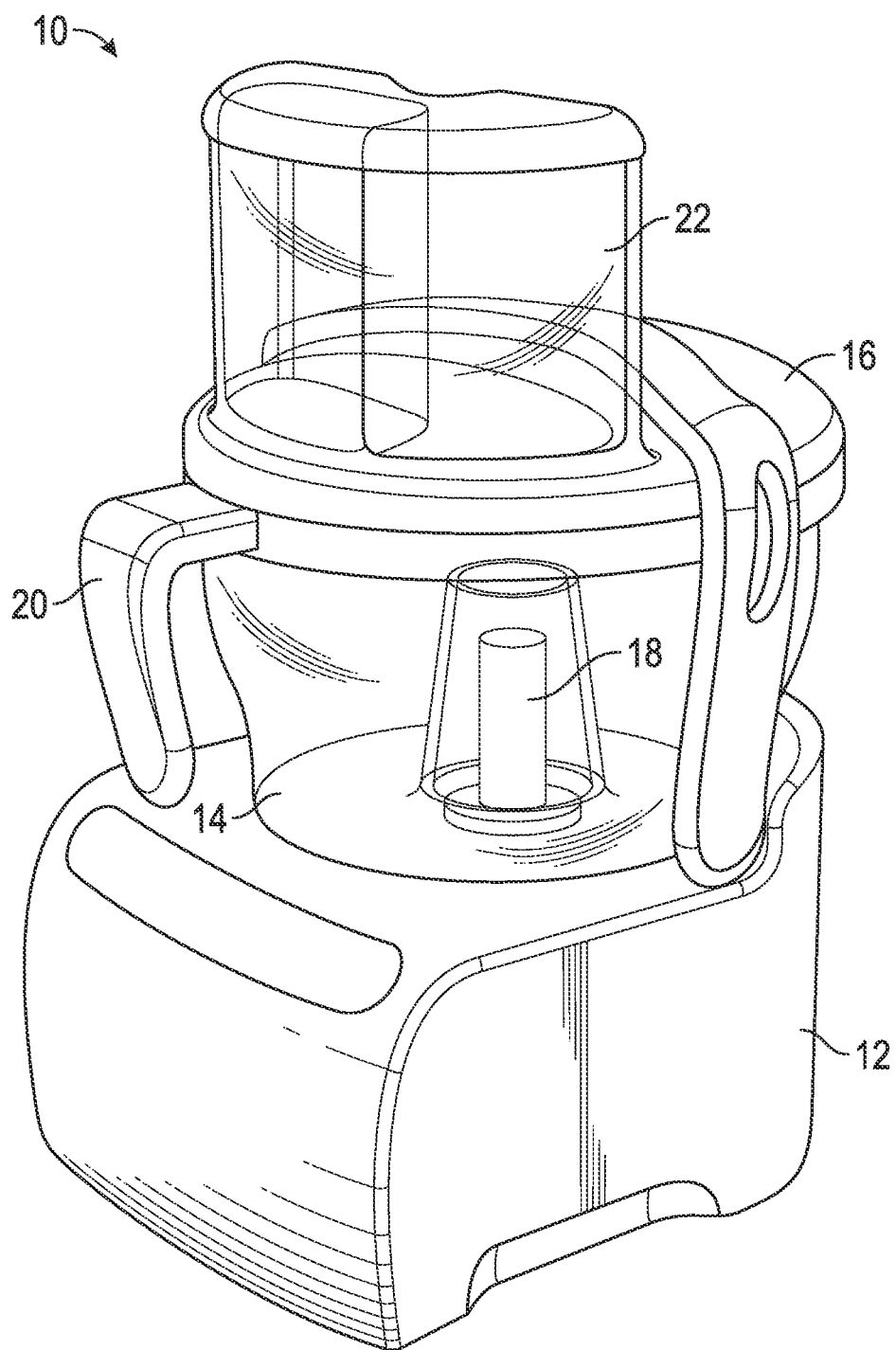
FIG. 1 is a perspective view of a food processor according to an embodiment of the present invention.

Referring to FIG. 1, a food processor 10 according to the present invention is shown. The food processor 10 includes a base 12, a work bowl or receptacle 14 received on the base 12, and a lid 16 configured to be selectively removable from the work bowl 14. Base 12 includes a motor or other rotary drive mechanism (not shown) connected to a rotatable output shaft 18 for rotatably driving a blade interior to the work bowl 14 and may include controls (not shown) for varying settings of the motor.

As further shown therein, work bowl 14 is generally cylindrical or frusto-conical in shape and has a handle 20 and a pour spout (not shown). The lid 16 defines a substantially circular body sized and is dimensioned to cover work bowl 14. The lid 16 also includes a feed tube opening (not shown). The feed tube opening may be generally oval in shape, although other shapes and dimensions are envisioned without departing from the broader aspects of the present invention.

As best shown in FIG. 1, the lid 16 may also include a feed tube 22 defining a substantially annular body having a substantially oval cross-section extending upwards from the lid 16 and in communication with the feed tube opening. As is well known in the art, the feed tube 22 provides a chute through which a user may load food items to be processed into the work bowl 14.

Figure 2:
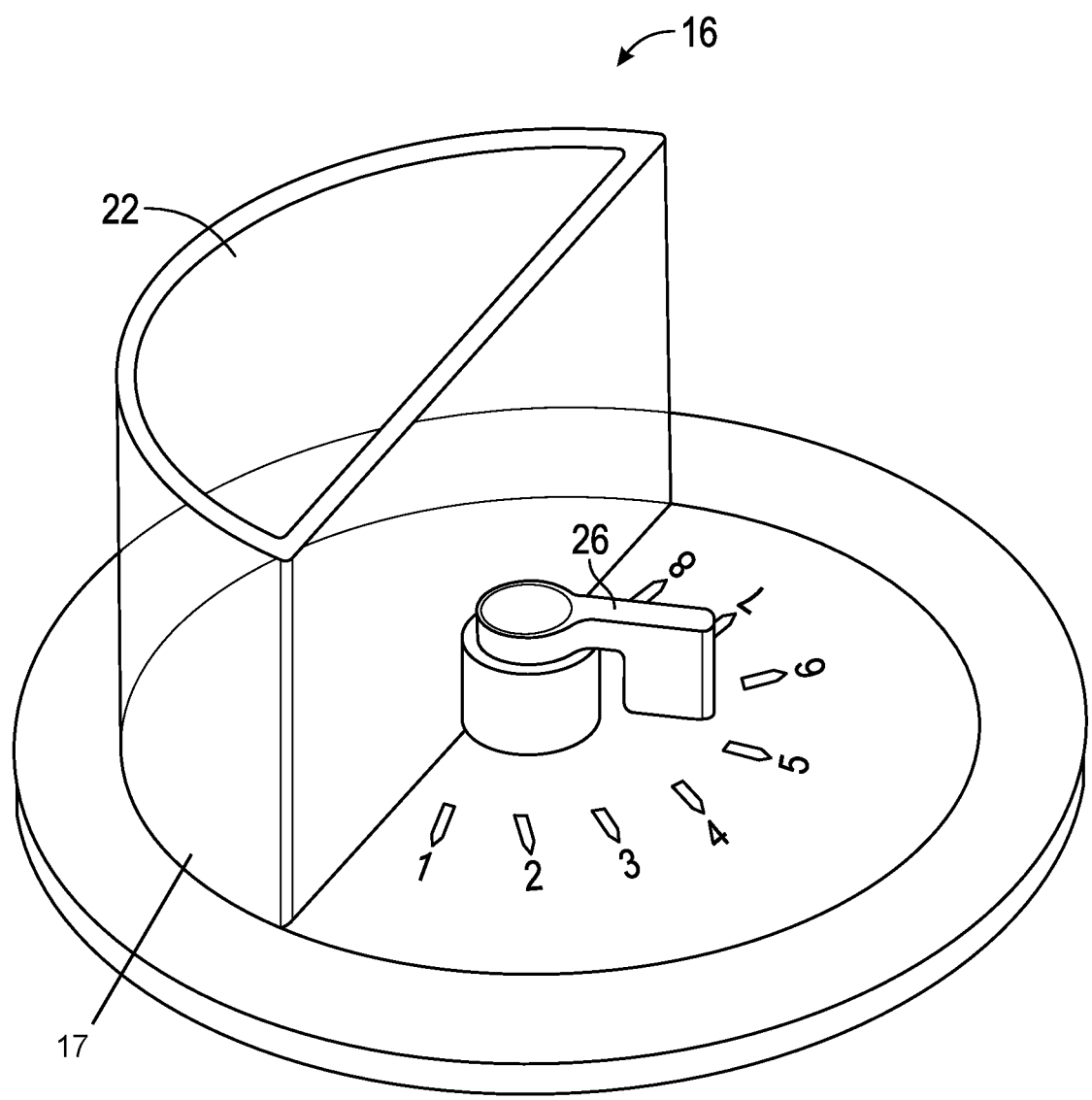
FIG. 2 is a perspective view of a lid and slicing disc adjustment mechanism according to an embodiment of the present invention.

Turning now to FIG. 2, an enlarged view of the lid 16 of the food processor 10 is shown. As shown therein, the lid 16 includes a food aperture 17 that opens into the work bowl 14 (not depicted in this figure). In this manner, food items that a user loads into the feed tube 22 can pass through the food aperture 17 into the work bowl 14 for processing. FIG. 2 also shows that the lid 16 can include a mechanism for adjusting slice thickness when the food processor 10 is utilized with a slicing blade 24. In particular, the slice thickness adjustment mechanism includes a lever 26 that is accessible from the top of the lid 16. The lever 26 extends through the center of the lid 16 and is rotatable between a variety of positions, marked 1-8 in FIG. 2, which correspond to various slice thicknesses.

Figure 3:
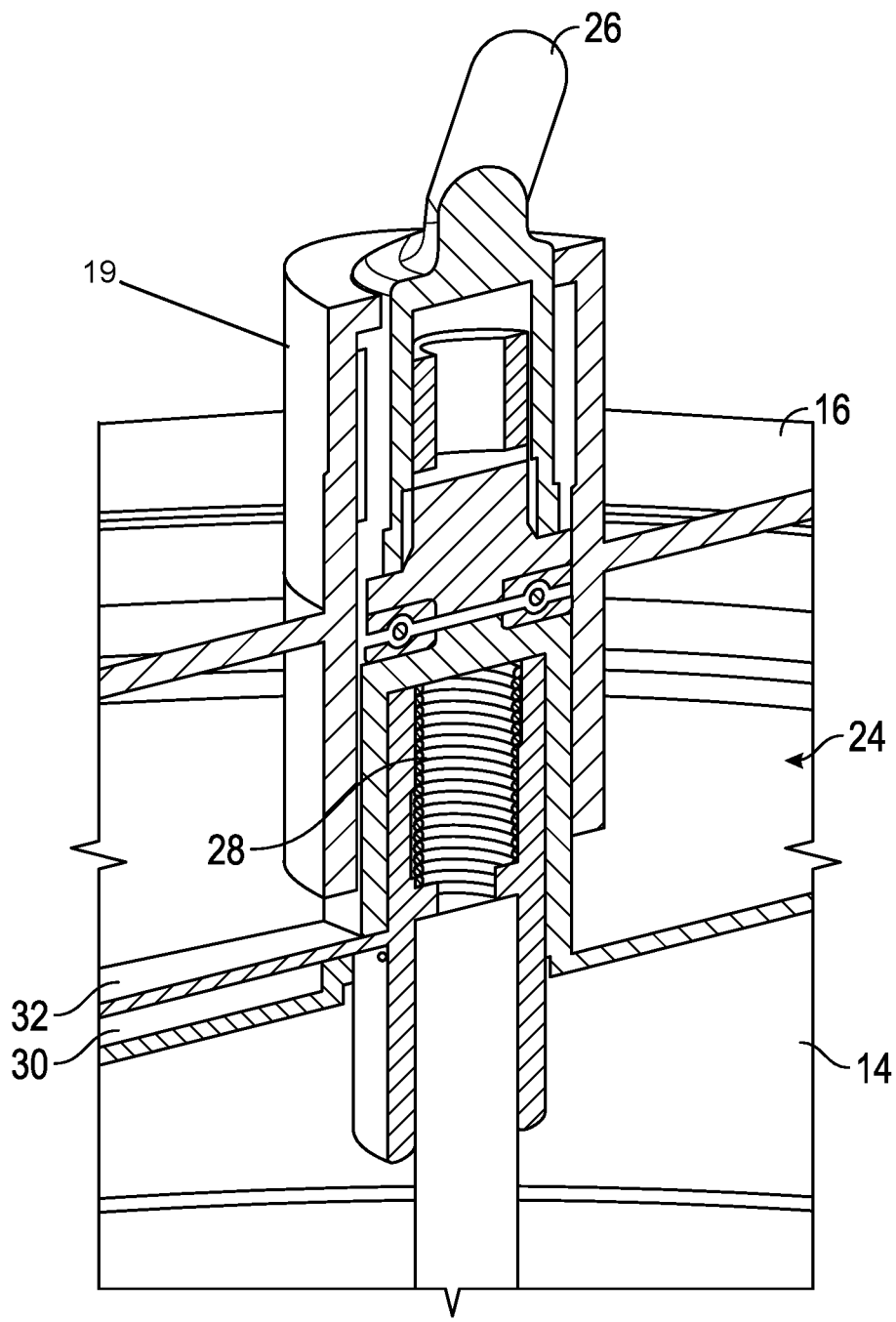
FIG. 3 is an enlarged, cross-sectional view of the slicing disc adjustment mechanism of FIG. 2.

With reference to FIG. 3, the lever 26 is coupled to a rotatable adjustment mechanism 28 which is, in turn, attached to the slicing disc 24. In the preferred embodiment, the adjustment mechanism 28 takes the form of a linear screw drive. The rotatable adjustment mechanism 28 is driven by the lever 26 to raise or lower the disc body 30 of the slicing disc 24 relative to the blade 32 of the slicing disc 24 to adjust the spacing therebetween. Alternatively, the adjustment mechanism 28 may be driven by the lever 26 to raise or lower the blade 32 relative to the disc body 30 to adjust the spacing therebetween. FIG. 3 shows that the lid 16 can further include a cylindrical pivot sleeve 19. As shown in FIG. 3, the cylindrical pivot sleeve 19 can receive the adjustment mechanism 28 therein. To this extent, the cylindrical pivot sleeve 19 surrounds at least a portion of the adjustment mechanism 28.

Figure 4:
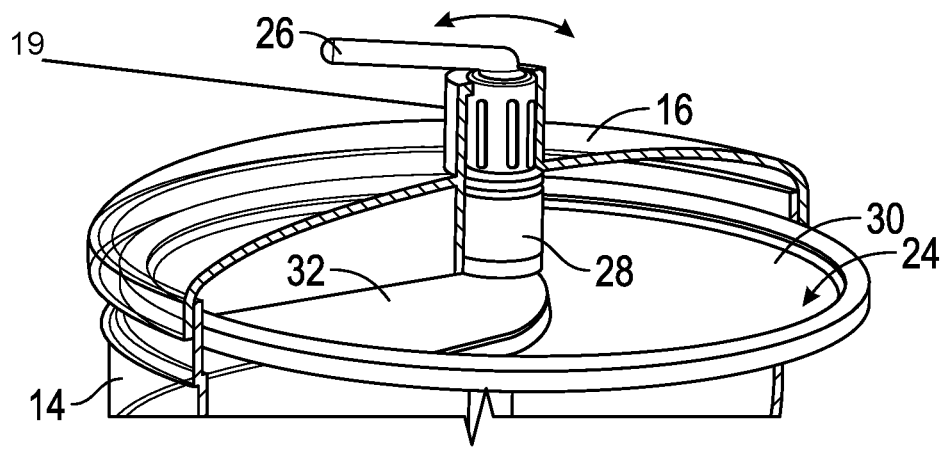
FIG. 4 is a perspective view of the slicing disc adjustment mechanism of FIG. 2, illustrating how slice thickness is adjusted.
Figure 5:
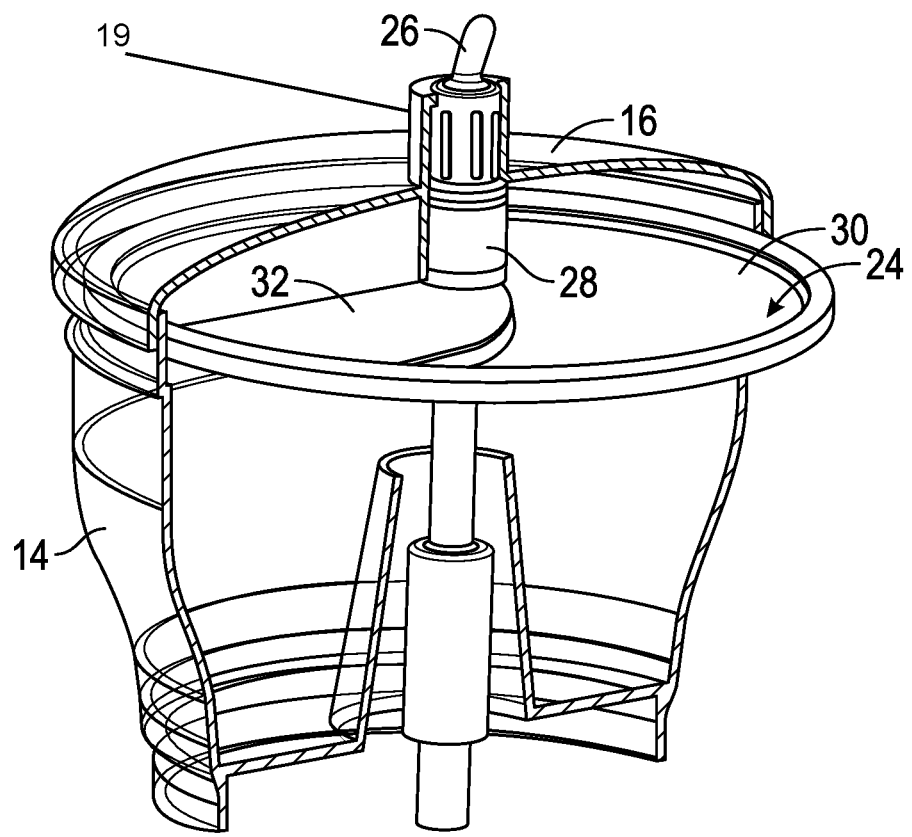
FIG. 5 is another perspective view of the slicing disc adjustment mechanism of FIG. 2.

Turning now to FIGS. 4 and 5, adjustment of slice thickness is illustrated. As shown therein, rotating the lever 26 actuates mechanism 28, thereby enabling a user to control the gap between the slicing disc body 30 and the slicing blade 32 to adjust the thickness of slices. As will be readily appreciated, slice thickness can therefore be adjusted from outside the bowl 14, while the lid 16 is closed.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processor employing a bladed assembly for selectively cutting slices of varying thicknesses from a food item, and having a lid and a work bowl, comprising:
    a circular cutting assembly removably positioned above said work bowl, said cutting assembly being driven by a motor to cut food pieces off said food item, said cutting assembly being positionable between a plurality of cutting positions to produce cut food pieces of said varying thicknesses;
    an adjustment mechanism operatively connected to a lid removably received on top of said work bowl, said adjustment mechanism being operable to move said cutting assembly between said plurality of cutting positions;
    wherein said lid includes a plurality of markings corresponding to said plurality of cutting positions;
    wherein said plurality of markings are observable and said adjustment mechanism is adjustable by an operator of said food processor during operation of said circular cutting assembly; and
    wherein said lid further comprises a cylindrical pivot sleeve to receive said adjustment mechanism therein, said cylindrical pivot sleeve rotatably surrounding at least a portion of said adjustment mechanism, wherein said adjustment mechanism is configured to pivot about said cylindrical pivot sleeve to move between said plurality of markings for selecting one of said plurality of cutting positions; and
    wherein a first portion of said cylindrical pivot sleeve extends out through an outer surface of said lid, and a second portion of said cylindrical pivot sleeve extends downward toward said work bowl.

2. A food processor employing a bladed assembly for selectively cutting slices of varying thicknesses from a food item, comprising:
    a work bowl;
    a lid removably received on and positioned above said work bowl, comprising:
        a cutting assembly removably positioned above said work bowl upon placement of said lid on said work bowl, said cutting assembly being driven by a motor to cut food pieces off of said food item, said cutting assembly being positionable between a plurality of cutting positions to produce cut food pieces of said varying thicknesses;
        an adjustment mechanism operatively connected to said lid and said cutting assembly, said adjustment mechanism being operable to move said cutting assembly between said plurality of cutting positions;
        wherein said lid includes a plurality of markings corresponding to said plurality of cutting positions;
        wherein said plurality of markings are observable and said adjustment mechanism is adjustable by an operator of said food processor during operation of said circular cutting assembly;
        wherein said lid further comprises a cylindrical pivot sleeve to receive said adjustment mechanism therein, said cylindrical pivot sleeve rotatably surrounding at least a portion of said adjustment mechanism, wherein said adjustment mechanism is configured to pivot about said cylindrical pivot sleeve to move between said plurality of markings for selecting one of said plurality of cutting positions; and
        wherein a first portion of said cylindrical pivot sleeve extends out through an outer surface of said lid, and a second portion of said cylindrical pivot sleeve extends downward toward said work bowl.

3. The food processor of claim 2, wherein:
said adjustment mechanism includes a rotatable position setting device coupled to an actuation device and to said cutting assembly.

4. The food processor of claim 3, wherein:
said position setting device is a linear screw drive.

5. The food processor of claim 3, wherein:
said cutting assembly includes a cutting blade and rotating disc body operatively connected to said output shaft.

6. The food processor of claim 5, wherein:
said adjustment mechanism is configured to selectively raise and lower said cutting blade relative to said disc body to adjust a spacing therebetween.

7. The food processor of claim 5, wherein:
said adjustment mechanism is configured to selectively raise and lower said disc body relative to said cutting blade to adjust a spacing therebetween.

8. The food processor of claim 5, wherein:
said disc body is substantially circular in shape and includes a cutout portion sized and shaped to receive said cutting blade therein.

9. The food processor of claim 3, wherein:
a portion of said actuation device extends through a center of said lid and is coupled to said position setting device.

10. The food processor of claim 2, wherein:
said work bowl is removably received on said base.

* * * * *